METHOD AND MEANS FOR NUMERICAL CODING

Filed May 23, 1967 2 Sheets-Sheet 1

Dec. 22, 1970 C. H. PICOU ET AL 3,550,115

METHOD AND MEANS FOR NUMERICAL CODING

Filed May 23, 1967 2 Sheets-Sheet 2

United States Patent Office 3,550,115

Patented Dec. 22, 1970

3,550,115

METHOD AND MEANS FOR NUMERICAL CODING

Claude H. Picou, Paris, and Philippe A. Angelle, Nantes, France, assignors, by mesne assignments, to Compagnie Generale de Geophysique, Paris, and L'Institut Francais du Petrole, Rueil-Malmaison, France Filed May 23, 1967, Ser. No. 640,743

Claims priority, application France, May 26, 1966, 63,010

Int. Cl. A03k *13/02*

U.S. Cl. 340—347 6 Claims

ABSTRACT OF THE DISCLOSURE

An improvement in or a modification of the copending application Ser. No. 604,221 according to which a plurality of geophones or like sources of voltages to be measured feed signals in alternation with the signals produced by a reference voltage to a common multiplexer, while an amplifier transmits the successive signals from the multiplexer through switches to corresponding sampling and storing means, whereby the latter feed in alternation an analogic to numeric converter with a reference signal and an associated useful signal, the useful signals being thus compared in succession with a reference signal. The reference voltage is advantageously a stabilized D.C. voltage.

The copending application No. 604,211 discloses a method for the numerical coding of signals the range of which is very broad and larger than that of the numerical recording means used hitherto. To this end, the reference voltage fed to the actual converter is modified by a succession of divisions, preferably by the digit 2 by means of a series of attenuators, the subdivided reference voltage passing then through an amplifier with a variable gain together with and under the same conditions as the signal to be measured, whereby it is possible to make sure that the gain of said amplifier does not interfere with the measurements made.

In said prior application, the reference voltage is constituted by the peak voltage of a generator of sinusoidal waves, said generator serving also for synchronizing the different switches and multiplexers and furthermore the multiplexers are inserted immediately ahead of the converter that is on the downstream side of the amplifier and also of the attenuators.

For this reason, it is necessary to use as many attenuating and amplifying systems with a variable gain as there are useful signals to be recorded, e.g. 28 in the example disclosed hereinafter.

According to a first object of the present invention, the multiplexing is performed no longer on the signals at the output end of the variable gain amplifier but on the useful signals at its input and also on those obtained at the output end of the attenuators. This allows using the same variable gain amplifier for a complete group of tracks and also the same system of attenuators; it is possible in fact to limit the arrangement to a single attenuating and variable gain amplifying system for all the tracks.

According to a further feature of the present invention the reference voltage serving for comparing purposes in obtained starting from a stabilized D.C. voltage instead of obtaining it through an A.C. voltage. This cuts out the necessity of inserting at the output end of the variable gain amplifiers expensive filters with a view to separating the A.C. voltage forming the reference voltage from the voltage formed by the signal to be measured, said filters being replaced by mere switches.

Furthermore, the invention allows cutting out two of the three multiplexers used in the embodiment disclosed in the above-mentioned copending application.

Further features of the invention will be disclosed in the following description given out by way of example and by no means in a limiting sense of preferred embodiments of said invention. In said drawings.

In the different figures, the same reference numbers refer to the same parts.

Figure 1:
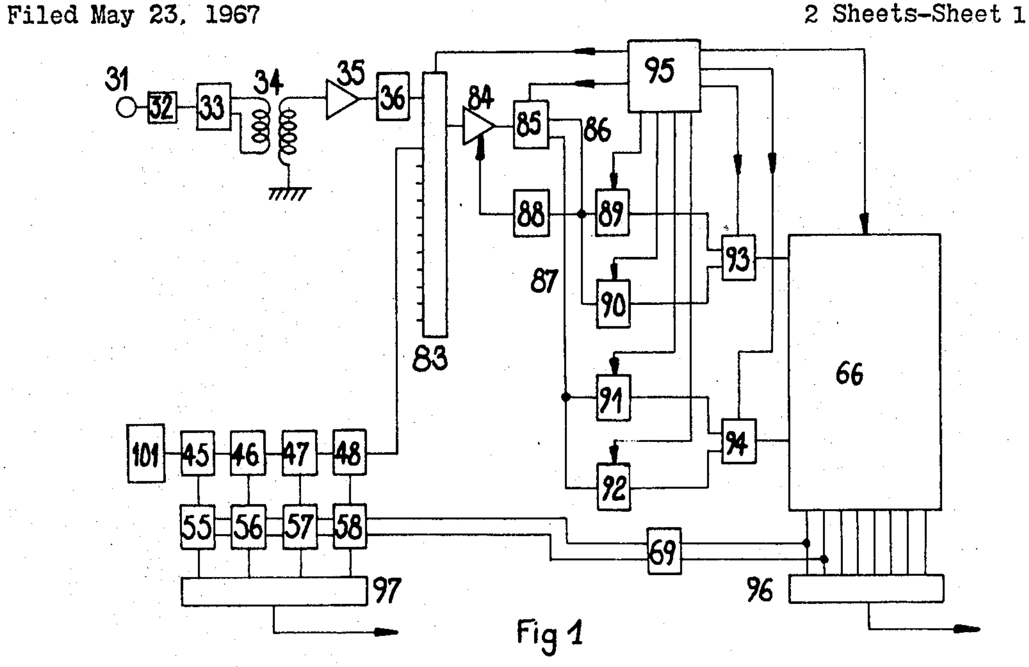
FIG. 1 is a wiring diagram of an embodiment showing the above features in the case where a single system of attenuators and a single variable gain amplifier are used for all the tracks.
Figure 2:
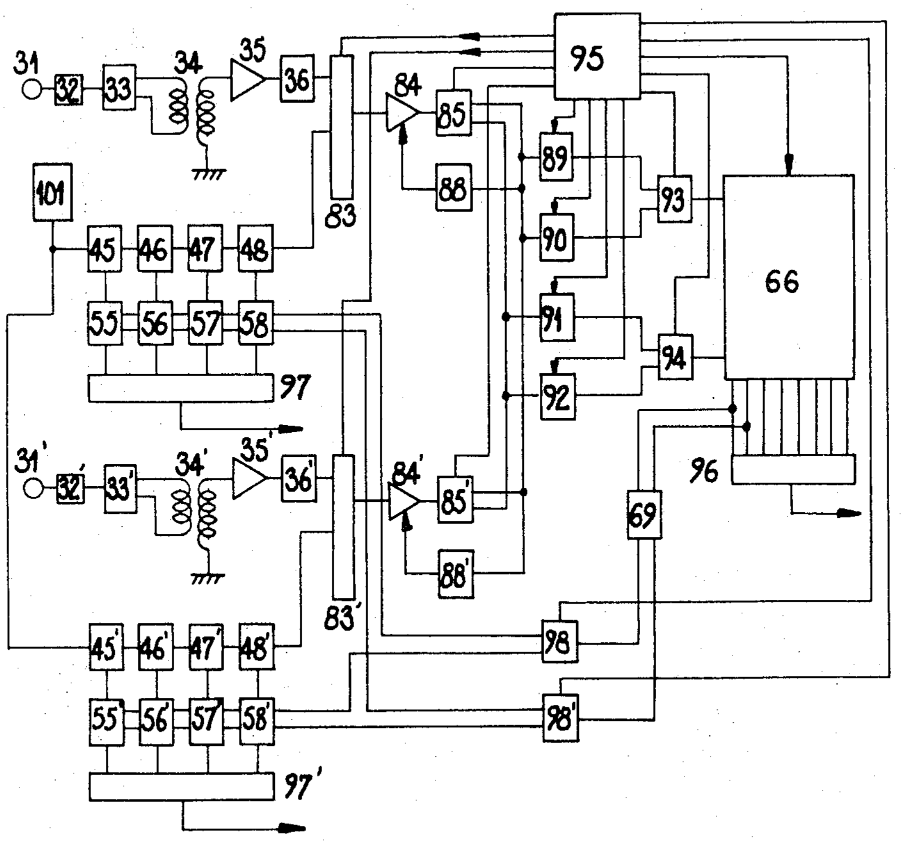
FIG. 2 illustrates an embodiment including several systems of attenuators and variable gain amplifiers.

In FIG. 1 relating to the case where a single group of attenuators and a single variable gain amplifier are used for all the tracks, the reference numbers 31 to 36 designate the same parts as those designated by the same reference numbers in FIG. 2 of the above-mentioned copending specification, to wit: 31 designates a signal collector such as a geophone, 32 a balancing circuit, 33 a low pass filter, 34 a booster transformer, 35, a preliminary amplifier providing an unvarying gain and 36 a high pass filter.

Also a series of four attenuators 45 to 48 is shown with the controlling means 55 to 58 as already illustrated in said FIG. 2 of the copending specification. Lastly, 66 designates the analogic to numeric converter and 69 the member acting on the controlling means 55 to 58 and which is controlled in its turn by the two last outputs of the converter 66. The structure and operation of the parts referred to hereinabove have already been described in said copending application.

According to the present invention, a multiplexer 83 is inserted immediately after the high pass filter 36 and consequently said multiplexer includes as many inputs as there are tracks or series of parts 31 to 36 together with further inputs for the reference voltage R formed in the chain of attenuators 45 to 48.

According to a further feature of our invention and in order to take into account all possible modifications during a multiplexing cycle of the value of the gain of the following amplifier 84, the instantaneous value of the reference voltage is tapped off after amplification just before each tapping off of a track signal and consequently if $n$ signals to be measured pass through the $n$ circuits 31 to 36, the output voltage of the attenuator 48 is fed to $n$ other inputs of 83, said inputs being inserted in alternation with those of the useful signals; consequently, the multiplexer 83 transmits first the reference voltage R from the chain 45, 48 and immediately afterwards the signal passing out of one collector 31 then again the reference signal R and again a signal from the next collector 31 and so on repeatedly.

101 designates the generator of the reference voltage constituted in the present case by a stabilized D.C. voltage supplied for instance by a Zener diode and applied at the input of the first attenuator 45. It is thus apparent that the system of parts 45 to 48 and 55 to 58 illustrated is the only one in the embodiment of FIG. 1.

The output of the multiplexer 83 feeds the input of the variable gain amplifier 84 the gain of which is controlled by a member 88, said parts 84 and 88 corresponding respectively to the amplifier 4 and to the gain controlling means 5 illustrated in FIG. 1 of the above-mentioned copending application.

The output of the amplifier 84 is fed to a switch 85 connecting the output of the amplifier 84 selectively with the lead 86 whenever said amplifier 84 amplifies a signal to be measured passing out of a collector 31 and with the lead 87 when the output of 85 is formed by the reference voltage. The switch 85 replaces consequently the filters 6 and 7 illustrated in FIG. 1 of the copending application.

It has been found that if the switch 85 is constituted by two field effect transistors, there is obtained a much simpler and more economical embodiment of the means separating the signals to be measured from the reference signals than with the incorporation of frequency filters, as in the case of the copending application.

The voltage fed by the lead 86 constitutes the input of the gain controlling means 88 and furthermore of the two locking and sampling means 89 and 90. On the other hand, the lead 87 feeds two locking and sampling means 91 and 92. Said four sampling means 89 to 92 are similar to the means 63 illustrated in FIG. 2 of the copending application.

The necessity of providing two sampling means for the reference voltage on the one hand and two further sampling means for the voltage to be measured on the other hand is ascribable to the fact that the analogic to numeric converter requires some time for its operation. Said operation consists in dividing the signal voltage by the reference voltage, which division can be undertaken only when the two terms of the division are available. Now, a sample of the reference voltage always precedes the signal sample and consequently it is necessary to store in a memory said reference voltage during the time required.

The outputs of the locking means 89 and 90 are connected with a switch 93, the output of which is consequently connected selectively with 89 or 90. Similarly, the outputs of 91 and 92 feed a switch 94 connecting selectively 90 and 92 with its output.

The output of the switch 94 supplies the reference voltage to the analogic converter 66 while the output of the switch 93 supplies the latter with the voltage corresponding to the signal to the measured.

The synchronous operation of the different switches 85, 93 and 94 and of the multiplexer 83 is controlled by a programming system or clock 95 in accordance with a timing programme as described hereinafter with reference to FIG. 3 and as illustrated symbolically by the arrow-carrying connections drawn between the different parts.

The means 69 act through the agency of the controlling means 55 to 58 on the attenuators 45 to 48 exactly in the same manner as in the case of the copending specification.

96 and 97 designate the transcoders adapted to transmit to the magnetic recording means which are not illustrated on the one hand the information fed by the output of the converter 66 and on the other hand the positions of the means 55 to 58 and consequently of the attenuators 45 to 48, which positions illustrate the position of the comma in the binary code 8, 4, 2, 1.

FIG. 2 illustrates diagrammatically an embodiment incorporating two attenuating and amplifying systems. It will be obvious from a reading of the following description that it is possible to use more than two systems, for instance 3, 4 or more systems.

The use of more than two systems allows grouping the signal collectors constituted for instance by geophones, the collectors being grouped in a manner such that the amplitude of the signals collected may be of a similar magnitude which allows resorting without any drawback to a same reference voltage for said different signals, while retaining the advantages disclosed in said copending application.

In said FIGS. 1 and 2 similar parts carry the same reference numbers which are provided with no dash for the first system and with one dash for the next one. Thus, FIG. 2 shows the two groups of parts 31 to 36 and 31′ to 36′ together with the corresponding attenuating systems and control means 45 to 48 and 55 to 58 and 45′ to 48′ and 55′ to 58′ respectively; the attenuators 45 and 45′ are fed permanently by the same reference voltage from the same supply 101. 83 designates the multiplexer for the first system, 83′ that for the second group, 97 and 97′ the transcoders illustrating the locations of the comma, respectively for the first and for the second group.

The variable gain amplifiers illustrated with their associated parts to wit the amplifier 84 or 84′, the switch 85 or 85′ and the gain controlling means 88 or 88′ are respectively associated with the multiplexer 83 and with the multiplexer 83′.

66 designates again the single analogic to numeric converter for the two groups, 95 the single clock or programming system, 96 the also single transcoder 96 associated with the converter 66.

The outputs of the switches 85 and 85′ are connected in parallel and they lead respectively to the locking and sampling means 89 and 90 for the signal to be measured and 91 and 92 for the reference voltage.

93 and 94 designate again the switches feeding the converter 66 with the signals passing out of 89 or 90 and out of 91 or 92. The parts 89 to 94 are also common to both systems.

The same is the case for the means 69 controlling the attenuators; between the output of said means 69 and the input of the controlling means 58 or 58′ are inserted switches 98 and 98′ respectively which allow connecting 69 with 58 for the first multiplexing cycle corresponding to the multiplexer 83 and then with 58′ for the second cycle corresponding to the multiplexer 83′.

In said embodiment, the complete cycle includes two sub-cycles, one of which corresponds to the multiplexer 83 and the other to the multiplexer 83′.

It will be noted that when one multiplexer is operative, the different inputs of the other inoperative multiplexers are grounded so as to cut out any undesired noise.

It will also be noted that during the sub-cycle corresponding to the multiplexer 83, the two outputs of the switch 85′ of the inoperative multiplexer 83′ are simultaneously cut off, so that the voltages supplied to the four locking and sampling means may be reliably fed solely by the multiplexer which is operative at the moment considered. Said different operations are controlled by the programming means 95.

Figure 3:
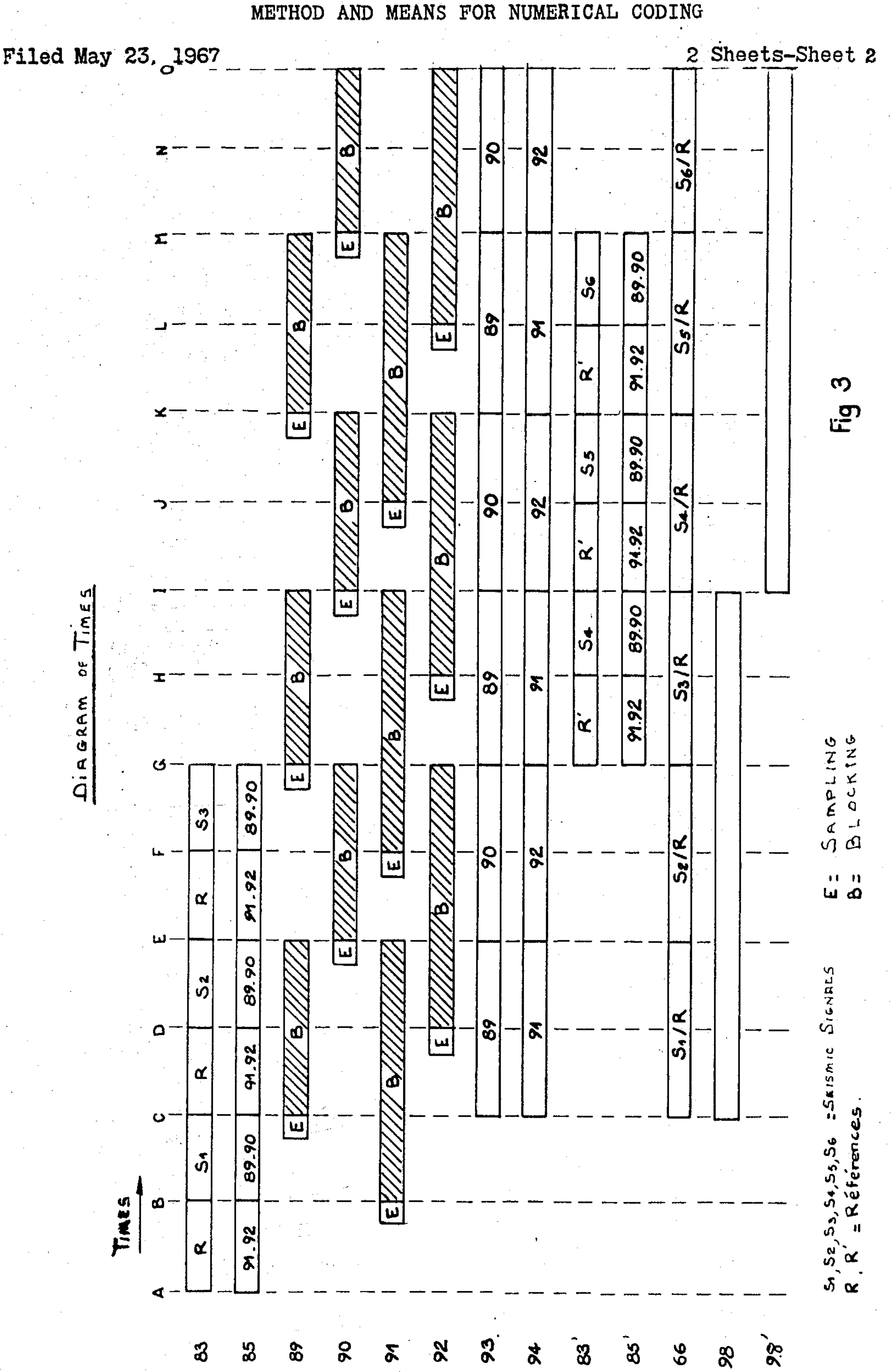
FIG. 3 is an explanatory chart showing the successive steps of operation.

FIG. 3 constitutes a chart of times which allows ascertaining at a glance the progression of the operation of the different parts described. It has been assumed that there are associated with each multiplexer 83 and 83′ three groups of geophones. Said chart illustrates also the different operative cycles of the parts 83, 85, 83′, 85′ and also 89 to 94 and 66, 98, 98′.

The times are shown on the abscissae and the different moments corresponding to a switching are defined by the letters A, B, C. The switchings appearing on a same vertical line correspond to a same moment.

As illustrated, during a first period extending between the point A and the point B, the multiplexer 83 transmits the reference voltage R from the attenuator 48 and then the signal S1 from one geophone 81 during the period BC. This being done, it transmits again the reference voltage R during the period CD and then the signal S2 collected by the second geophone connected therewith during the period DE, the reference voltage R during the period EF and during the period FG, the third signal collected by the third geophone connected with it.

The switch 85 sends the reference voltage R during the period AB simultaneously to the sampling and locking means 91 and 92 and then during the period BC it sends the first amplified signal S1 to the means 89 and 90; during the period CD, the reference voltage R to 91 and 92, then during the period DE the second signal S2 to 89 and 90 and finally during the period FG the third signal to 89 and 90.

The locking and sampling means 89 sample the voltage corresponding to the first signal at the end of the period BC and then during the period CE, and then during the period CE, they store in their memory said sampled voltage, after which they sample the third signal at the end of the period FG and during the period G1, they store in their memory the value of the voltage thus sampled.

On the other hand, the locking and sampling means 90 sample at the end of the period DE the second signal and store in their memory during the period EG the value thus sampled.

The locking and sampling means 91 sample at the end of the period AB the reference voltage associated with the first signal and store it in their memory during the period BE and at the end of the period EF they sample the reference voltage associated with the third signal and store it in their memory during the period FI.

On the other hand, the locking and sampling means 92 sample at the end of the period CD the reference voltage associated with the second signal and store said voltage in their memory during the period DG.

The switch 93 transmits to the converter 66 the voltage fed by the sampling and locking means 89 during the period CE and then that fed by 90 during the period EG and again the voltage from 89 during the period GI and so on. On the other hand, the switch 94 transmits to the converter 66 the voltage from 91 during the period CE and then that from 92 during the period EG and then again that from 91 during the period GI and so on.

The converter 66 measures the ratio between the voltage corresponding to the first signal and the reference voltage during the period CE and then it performs the corresponding operation for the second signal during the period EG and that for the third signal during the period GI.

The operations for the second group connected with the multiplexer 83′ begin at the moment G and the multiplexer 83′ taps off during the period GH the reference voltage R′ passing out of the attenuator 48′ and then during the period HI the signal S4 out of the first geophone of the group 31′. This being done, it taps off again during the period IJ the reference voltage R′ and during the period JK the signal S5 from the second geophone of the series 31′ and lastly during the period KL the reference voltage R′ and during the period LM the signal S6 from the third geophone of the series 31′.

The switch 85′ transmits to 91 and 92 during the period GH the reference voltage R′ and then during the period HI it transmits to 89, 90 the amplified signal S4 from 84′, then during the period IJ to 91, 92 the reference voltage R′ and during the period JK to 89, 90 the amplified signal S5 from 84′ and during the period KL again the reference voltage R′ to 91, 92 and during the period LM to 89, 90 the amplified signal S6 from 84′.

Lastly, the switch 98 acts on the first system of attenuators 45 to 48 during the period CI, whereas the switch 98′ acts on the system of attenuators 45′ to 48′ starting from the moment I up to the moment O.

Obviously, many details may be modified in the embodiments described hereinabove, without thereby widening the scope of the accompanying claims. In practice, and turning by way of example to the case of 28 useful tracks corresponding to 24 geophones and 4 auxiliary tracks, it is also possible to subdivide advantageously said 28 tracks into four groups including each 7 tracks.

What we claim is:

1. In an analogic to numeric converter system adapted to compare voltages fed by a plurality of sources of voltages to be measured with the voltage fed by a supply of a reference voltage, the combination of a multiplexer including an output and a plurality of pairs of two inputs connected respectively with said supply and with each successive source of voltage, an amplifier fed by the output of the multiplexer, means controlling the gain of the amplifier, attenuators inserted between the supply of a reference voltage and the multiplexer, a first switch connecting the amplifier output with the gain controlling means, separate sampling and locking means fed by said first switch with signals amplified by the amplifier and corresponding alternatingly to the reference voltage and to one of the voltages to be measured, two further switches including inputs connected respectively with the sampling and locking means fed with the reference voltage signals and with the sampling and locking means fed with the signals corresponding to the voltages to be measured, a converter adapted to receive separately and to compare the signals passing out of said two further switches and means controlled by the output of the converter and acting on said attenuator to maintain the reference voltage within the range of the voltages to be measured.

2. A converter system as claimed in claim 1, wherein the supply of a reference voltage produces a stabilized DC voltage.

3. A converter system as claimed in claim 1, wherein the separate sampling and locking means include two pairs of two similar means operating at least partly in succession.

4. A converter system as claimed in claim 1, wherein the plurality of sources of voltages to be measured are subdivided into groups each being associated with a multiplexer the inputs of which are fed by the corresponding sources and by the supply, with an amplifier fed by the output of the multiplexer, with means controlling the gain of the amplifier, with attenuators inserted between the supply and said multiplexer and with a first switch connecting the amplifier output with the gain controlling means, the first switches corresponding to the different groups feeding in alternation the separate sampling and locking means of the system connected through the further switches with the converter, independent means controlled by the output of the converter for acting on the attenuators feeding the multiplexers fed by the sources of voltage of the different groups.

5. A converter system as claimed in claim 1, comprising means adapted to synchronize the operation of the multiplexer, of the first switch, of the sampling and locking means and of the further switch.

6. A converter system as claimed in claim 1, comprising transcoders adapted to transmit the signals produced by the converter and the operative condition of the attenuators.

References Cited

UNITED STATES PATENTS

| | | | |
|---|---|---|---|
| 3,145,376 | 8/1964 | Currie | 340—347 |
| 3,414,818 | 12/1968 | Reidel | 340—347 |

MAYNARD D. WILBUR, Primary Examiner

J. GLASSMAN, Assistant Examiner